Jan. 1, 1935.  M. A. RABKIN ET AL  1,985,948
ILLUMINATED RADIO INDICATOR
Filed March 10, 1930    3 Sheets-Sheet 1

INVENTORS
MORRIS A. RABKIN AND
ABRAHAM S. GREENBERG
BY
ATTORNEY

INVENTORS
MORRIS A. RABKIN AND
ABRAHAM S. GREENBERG
ATTORNEY

Jan. 1, 1935.  M. A. RABKIN ET AL  1,985,948
ILLUMINATED RADIO INDICATOR
Filed March 10, 1930   3 Sheets-Sheet 3

INVENTORS
MORRIS A. RABKIN AND
ABRAHAM S. GREENBERG
BY
ATTORNEY

Patented Jan. 1, 1935

1,985,948

UNITED STATES PATENT OFFICE 1,985,948

ILLUMINATED RADIO INDICATOR

Morris A. Rabkin and Abraham S. Greenberg, New York, N. Y., assignors to Radio Corporation of America, a corporation of Delaware Application March 10, 1930, Serial No. 434,598

16 Claims. (Cl. 116—124.1)

Our present invention relates to indicators, and more particularly to illuminated indicating devices used on radio receiving sets.

Since the introduction of the uni-control tuning system for radio receivers many types of devices have been utilized for indicating to the set user adjustments made to the tuning instrumentality of the set. Some of these devices were of the mobile drum or dial type. Others were of the fixed scale type. The latter type generally comprised a common actuating means for a plurality of tuning means, and included a suitable movable indicator associated with the actuating means, the movable indicator cooperating with the outside surface of a scale fixed in an opening of the cabinet. However, such prior devices can be improved upon to eliminate various disadvantages inherent therein.

We have, therefore, devised a novel and greatly improved system for indicating the adjustments made to a concealed electrical control element, and specifically to indicate the positioning of the tuning shaft of a radio set in an efficient, positive and ornamental manner. Briefly, we utilize, in the present arrangement, illumination for indicating purposes. An area of light, of predetermined configuration, is projected upon a scale screen, the area being of a color contrasting with the color of the screen, and being additionally, continuously (or intermittently) movable across the screen field in such a manner as to coincide with predetermined scale indications on the screen upon actuation of the tuning instrumentality.

Accordingly, it is one of the main objects of the present invention to provide a method of, and means for, positioning a concealed electrical instrumentality, which consists in projecting a beam of colored light upon an image receiving scale screen, the latter being illuminated in a manner contrasting in color with the image projected on it, and varying the position of the image on the screen when the tuning instrumentality is varied to a predetermined station position, the screen image being constantly visible during the actuation of said instrumentality.

Another important object of the invention is to provide a method of, and means for, indicating adjustments of a tuning instrumentality in a radio set on a screen bearing station designations which consists in providing a source of illumination, positioning one or more light-transmitting elements in the path of said source, said element or elements being colored in contrast with said source, and then transmitting light from said source through said element or elements in accordance with adjustment of the instrumentality whereby said screen designations have associated with them areas of light colored in accordance with said adjustment.

Another object of the invention is to provide in a radio set including a tuning instrumentality housed within a cabinet a control panel provided with a screen bearing station designations and a tuning knob, a source of illumination, one or more light-transmitting elements positioned between said screen and source, and means, operable in accordance with said knob, for controlling the passage of light from said source through any of said elements whereby predetermined designations on the screen have projected adjacent them an area of illumination colored in accordance with a given element.

Still other objects of the invention are to provide an indicating device of simple, practical construction which will possess an inherent ornamental appearance absent in present dial arrangements; and be rugged, durable and efficient in usage, and particularly well suited to the requirements of economical manufacture and ready manipulation.

The novel features which we believe to be characteristic of our invention are set forth in particularity in the appended claims, the invention itself, however, as to both its organization and method of operation being best understood by reference to the following description taken in connection with the drawings in which we have indicated diagrammatically several circuit organizations whereby our invention may be carried into effect.

Figure 3:
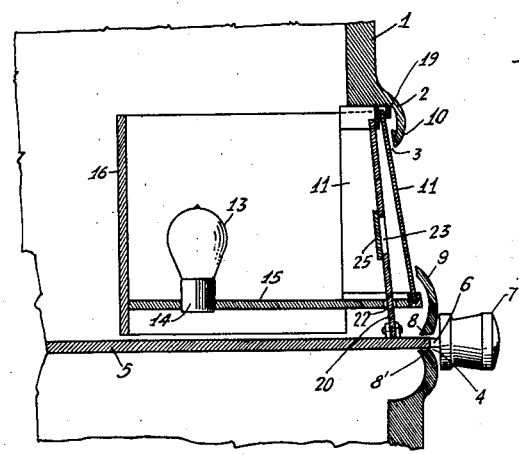
Figure 4:
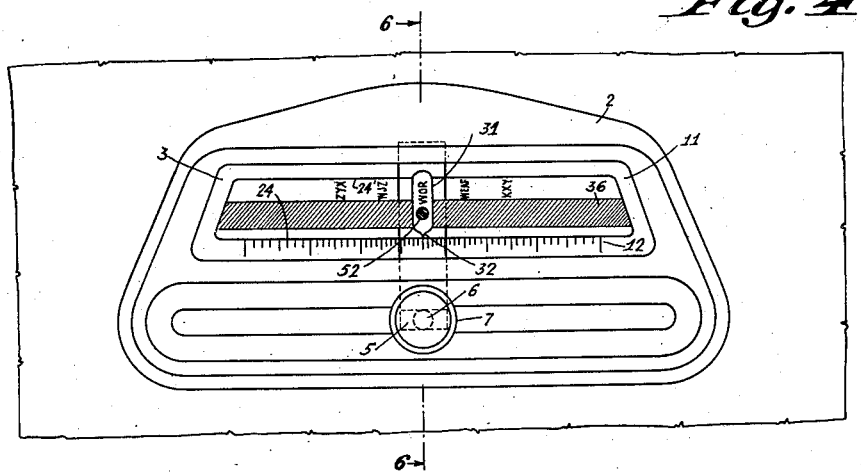
Figure 5:
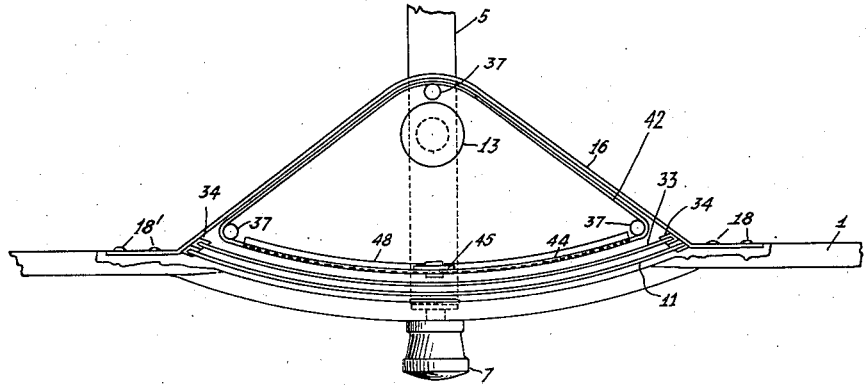
Figure 6:
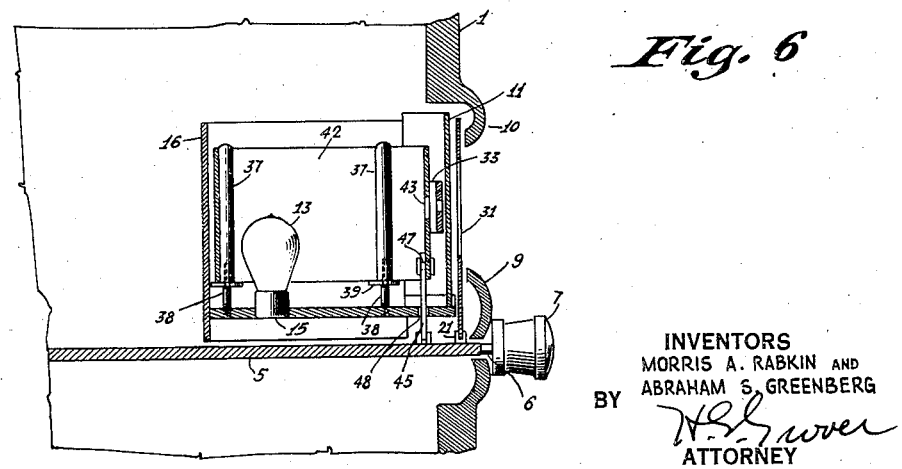
Figure 7:
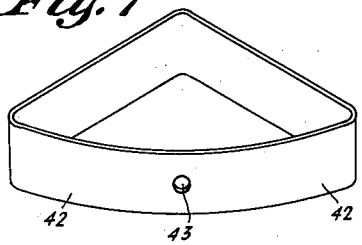
Figure 8:
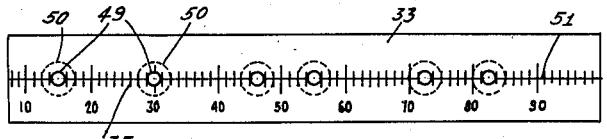
Figure 10:
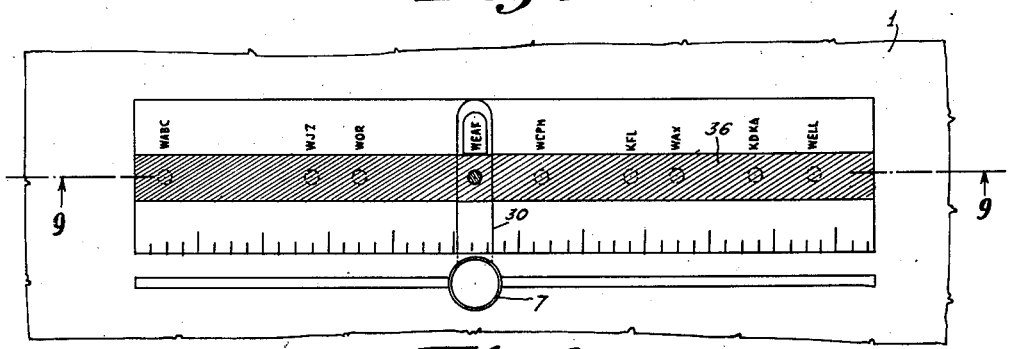
Figure 9:
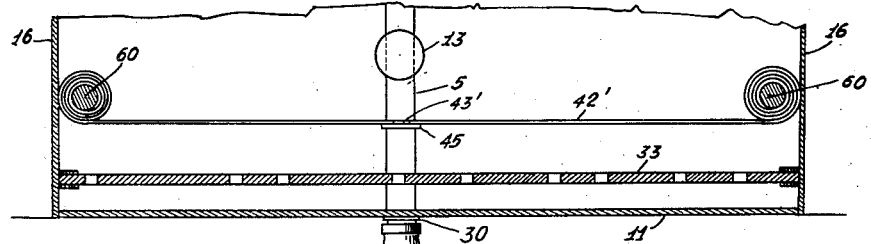
Figure 11:
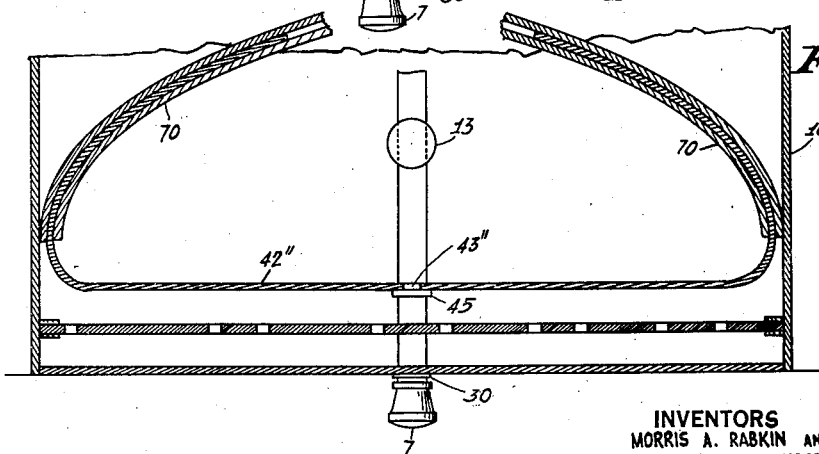

Fig. 3 is a sectional view taken on line 3—3 looking in the direction of the arrows, Fig. 4 is a fragmentary front view of a modified form of the invention, Fig. 5 is a plan view of the modification in Fig. 4, Fig. 6 is a sectional view taken on line 6—6 of Fig. 4 looking in the direction of the arrows, Fig. 7 is a detailed view in isometric of an element of the modification, Fig. 8 is a detail front view of another element of the modification described in Fig. 4, Fig. 9 is a fragmentary plan view of still another form of the invention, Fig. 10 is a fragmentary front view of the modification in Fig. 9, Fig. 11 is a fragmentary detailed view, in plan, of a modified form of an element of the modification in Fig. 9.

Figure 1:
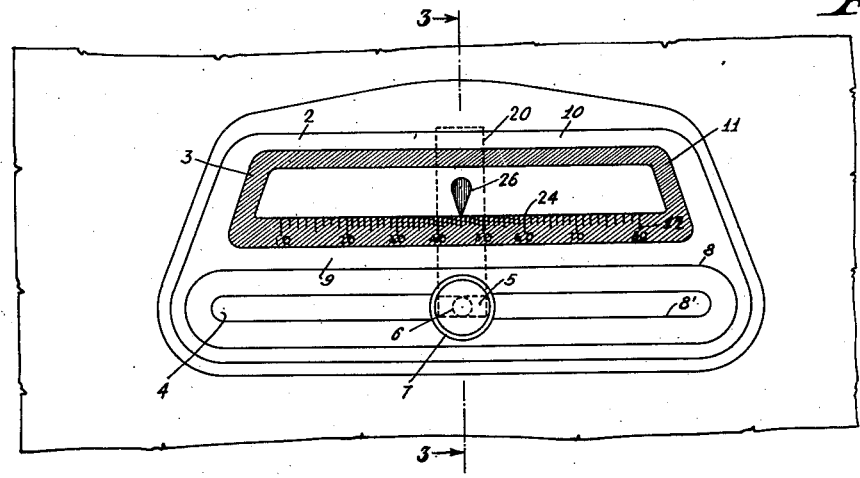
Fig. 1 is a fragmentary front view of the invention.

Referring to the accompanying drawings in which like characters of reference indicate the same parts in the different views, there is shown in Fig. 1 a control panel 1 of a radio receiving set, the set being viewed from the exterior thereof, attention being directed to the dial plate 2. The latter is provided with two apertures 3 and 4, the plate being circular about a vertical axis coinciding with that of the tuning arm 5.

Only a portion of this tuning arm is shown herein, reference being made to U. S. Patent 1,707,948, patented April 2, 1929 by H. F. Elliott, for a more complete disclosure of the detailed construction of the tuning instrumentalities which are connected to the arm or lever 5. It is to be clearly understood that while the arm 5 necessarily cooperates with the indicating device to be hereinafter disclosed, the tuning instrumentalities of the radio receiving circuit, which are associated with this arm 5, do not form the subject matter of the present invention, and therefore need not be disclosed other than by reference to the aforesaid patent. The lever or arm 5 has an extension 6, comprising a rotatable rod, on which is supported a rotatable tuning knob 7 arranged to coact with the top and bottom edges 8, 8' of the aperture 4 to shift the arm 5 from side to side in an arcuate path, it being understood that this arcuate, reciprocatory movement of the arm 5 is utilized for actuating the tuning condensers in the radio receiving set, as clearly disclosed in the aforementioned Elliott patent. Furthermore, although not forming a part of the present invention, the knob 7 can be rotated about the extension 6 for fine reciprocatory adjustment of the arm 5, this feature being also clearly disclosed in the aforesaid Elliott patent.

It will be observed from Fig. 3 that the lower edge 9 of the upper aperture 3 of the dial plate 2 projects outwardly beyond the upper edge 10 of the said aperture. A stationary scale plate 11, curved in accordance with the contour of the aperture 3, is exposed to view through the plate 2 of the upper aperture 3. This plate is preferably transluscent and may be made of mica, celluloid, waxed cardboard, glass or the like. The scale plate will hereinafter be called a scale screen.

The exposed surface of the scale screen 11 is provided with station designations 12, arranged in any suitable and predetermined manner. As shown in Fig. 1 the screen has provided on its exposed face an outline corresponding in shape with that of the aperture boundaries, the lower edge of the design on the scale having the scale graduations. The upper edge of the design on the scale may have station call letters inscribed thereon above the designations, usually numbers, 12.

The scale screen 11 is illuminated from the rear thereof by a source of illumination 13. This source is preferably a small incandescent lamp which may be energized from the same source (not shown) which is utilized to energize the electrical circuits of the radio receiving set, also not shown. The bulb 13 is mounted behind the rear surface of the scale screen 11, by inserting it into a socket 14, the socket being provided in a metal base 15. The base 15 is provided further with a curved protecting wall 16, said wall extending below the base 15 in proximity to the top surface of the tuning arm 5, as clearly shown in Fig. 3. The ends 17, 17' of the wall 16 are secured to the rear face of the control panel 1 by any suitable securing means 18.

The scale screen is mounted in an aperture frame 19, the side, top and bottom edges of the scale being mounted in the U-shaped brackets which comprise the frame. The side edges of the frame are rigidly affixed to the rear face of the control panel 1 by the same fastening means 18 which secure the ends of the wall 16 to the said panel. It will therefore be seen that the base 15, the curved rear wall 16, and the oppositely curved front screen 11 form an approximately elliptical chamber having an open top, the source of illumination being mounted in said chamber, and from which source, rays are projected upon the rear of the screen to illuminate the entire field thereof.

In order to indicate at any time, when the tuning arm, or instrumentality, as it will hereinafter be called, is adjusted to a predetermined position, means is provided for projecting an image upon the screen, which image preferably has a color in contrast to the color of the field upon which it is projected. To accomplish this, an elongated, transparent member 20 is vertically supported on a U-shaped bracket 21 rigidly affixed to the upper surface of the arm 5, the bracket being spaced rearwardly of the aperture 4 in the dial plate 2. The base 15 is provided with an arcuate slot 22, the slot being spaced a short distance to the rear of the scale screen 11. The member 20 is confined to reciprocatory arcuate movement in the said slot, and moves in accordance with the movement of the arm 5. The member 20 is preferably no wider than the arm 5, as shown in dotted lines in Fig. 1. Furthermore, the transparent support 20 is provided with an aperture 23 at a point along its length such that the horizontal projection of the lower edge of the aperture is in alignment with the lower edge 24 of the design on the exposed face of the scale screen.

A piece of colored, translucent material, such as paper, mica, glass or the like is affixed to the rear face of the support 20, by any securing means such as adhesive or cement, the colored material 25 completely covering the aperture 23. It will thus be seen that rays of light from the source 13 will illuminate the entire screen 11 with a single color, except that portion of the screen field in alignment with the aperture 23, whereby a colored image of the configuration of the aperture 23 is projected upon the screen 11. The configuration of this image may be any desired, one such preferred shape 26 being shown in Fig. 1, it being observed that the shape is somewhat like a segment of a circle, the vertex of the triangular portion contacting with the edge 24 along which are arranged the scale designations 12.

Figure 2:
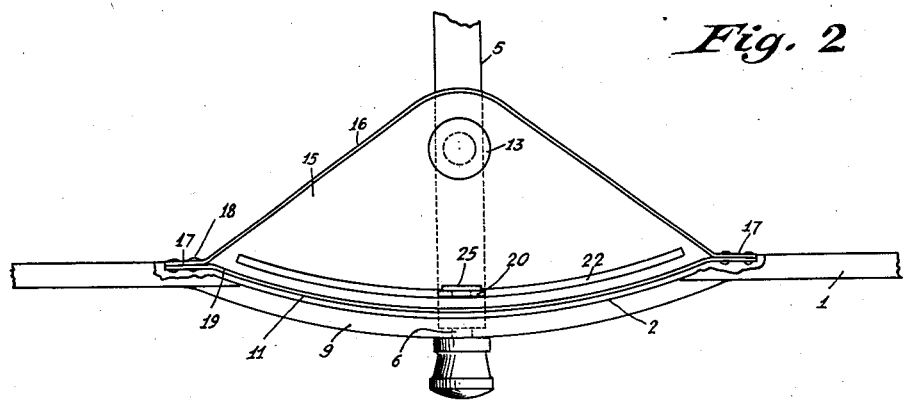
Fig. 2 is a fragmentary plan view of the device.

The transparent support 20 is arranged as close to the rear face of the scale screen 11 as is practical, it being pointed out that the closer these members are, the less chance there is of light from the source 13 filtering around the edges of the colored member 25. Furthermore, while it is preferred that the normal color of the electric bulb be employed to illuminate the screen field, and the color of the member 25 be strongly contrasting therewith, it is entirely within the scope of the present invention to provide the bulb 13 with any color which shall be in contrast with the color of the member 25. It will be obvious from the aforegoing description and Figs. 1, 2 and 3 that the colored index image 26 will be continuously and constantly visible on the screen field, and will be efficiently employed as an index when the tuning knob 7 is moved from one position to another position for changing from one station to another station. The station call letters may be inscribed on the face of the screen above the station designations 12, thus aiding in finding the desired station quickly and without annoyance. It will be realized that the present indicating device does away with the need for employing a finder on the exterior of the scale, and thereby imparts to the dial plate a pleasing and smart appearance, quite absent from receivers of present day construction.

It may be desirable to indicate on the exposed surface of the scale screen a position of a particular desired station by employing a colored area of light, which colored area shall only be visible when the station desired is tuned to. Again, in addition to the aforegoing, it may be desired that several such indications shall appear on the screen, each indication being of a color different from the other indication. In Figs. 4 to 8 inclusive, there is shown a modified form of the invention which provides for such contingencies. The scale screen 11 is the same in this modification, as heretofore described.

In fact, the exterior appearance of the control panel is exactly the same as heretofore described with few exceptions to be hereinafter noted. An elongated transparent finder 30 is mounted on the top surface of the arm 5, the finder being positioned, in this modification, in front of the exposed surface of the scale screen 11. An index aperture 31 is provided in the finder, the length of the aperture being equal to the width of the design on the scale screen face, the lower portion of the aperture 32 coming to a point adjacent the lower edge 24 provided with station designations 12. The finder 30 is rigidly affixed to the arm 5 by the U-shaped bracket 21, and the upper portion thereof is positioned to the rear of the upper edge 10, while the lower portion of the finder is positioned to the rear of the lower edge 9 of the dial plate 2.

The interior construction is the same as heretofore described for the first form of the invention, rear wall 16, base 15 and screen 11 cooperating to provide an approximately elliptical housing for the source of illumination 13. A rectangular strip 33 of opaque material, such as paper, and preferably waxed (a strip being shown in detail in Fig. 8) is slidably mounted in proximity to the rear of the face of screen 11. The strip is mounted at its ends in U-shaped brackets 34, the latter being affixed to the sides of the walls 16 in any desired manner. One face of the strip 33 is provided with station designations 35 arranged in such a manner on the strip that when the strip is positioned between the brackets 34, the scale designations 35 will be in perfect, or substantially perfect, alignment with the scale designations 12 on the exposed surface of the screen 11.

The width of the strip 33 is such that when the rays from the source 13 fall upon the rear face of the screen 11 a non-illuminated band 36 is produced upon the exposed face of the screen, the band being substantially of the same width as the strip 33, and being positioned on the screen surface mid-way between the lower edge 24 of the scale design and the upper edge 24' thereof. It is to be noted that the brackets 34 are to be so positioned on the rear wall 16 that the extremities of the scale designations 35 of the band do not fall outside the sides of the design on the screen 11.

At three points on the base 15, within the elliptical housing formed by the wall 16, the base 15 and the front screen 11, and to the rear of the strip 33, there are positioned three vertical rollers 37. Each roller 37 is mounted upon a pin 38 for rolling movement thereon, each pin being rigidly affixed to the base 15. Each pin is provided with a small, circular support plate 39, and a projecting bearing 40, while the lower base of each roller rests upon the said plate 39, the roller being provided with an aperture 41 which receives the projecting shaft 40. One of the rollers is positioned above the arm 5 in proximity to the rear wall 16, while the other two are positioned at opposite ends of the wall 16, and adjacent each of the brackets 34 for supporting the strip 33.

An endless band of stiff, but flexible material 42 is mounted for sliding movement relative to the rollers 37, the lower edge of the band contacting and being supported by the peripheries of each plate 39 of the support pins 38. The band is shown in isometric detail in Fig. 7, it being observed that the band is provided with an aperture 43. This aperture is provided in the front section 44 of the band. The band may be made of celluloid, or any other flexible material possessing stiffness, and is made opaque. The lower edge of the front portion 44, beneath the aperture 43, is mechanically coupled to the arm 5 by an extension member 45. The latter is mounted in a bracket 46 which is affixed to the top surface of lever 5.

The upper end of the member 45 is rigidly secured to the front portion 44 by a bolt and nut 47. The base 15 is provided with an arcuate slot 48, the latter being disposed in a line projected from the edge of front portion 44.

Thus, when the knob 7 is moved to the right or left, the band 42 is moved around the rollers 37. This results in the positioning of aperture 43 at different points rearwardly of the strip 33. Of course, since strip 33 is opaque, only a dark band will be observed on the central portion of screen 11, if no aperture is made through the strip 33. If, however, such an aperture, or apertures, as shown at 49 be provided in the strip 33, then, when the band aperture 43 and a strip aperture 49 are in alignment, a lighted image of the aperture 43 appears in the dark band 36, in alignment with the band and strip apertures. Again, if an aperture 49 is covered by a transparent, colored piece of material 50, the material being pasted over the aperture, then the image projected in the dark band will be colored similarly. A line 51 is provided along the central portion of the strip to guide the user in punching holes 49, the line 51 being so positioned on the strip that an aperture 49 central thereof is substantially in alignment with the dark band 36 and aperture 43 in the endless band 42.

It will be readily understood, therefore, that to use the modified form of the device, it is only necessary to pierce apertures 49 at different points on line 51 of strip 33, these points being determined when the set is installed by determining what scale designations 12 on screen 11 correspond to desired stations, and if desired, to paste materials 50 of different colors over each aperture 49. The strip is then slipped into position between brackets 34. When the set is operated and the bulb 13 energized, the entire field of the scale 11 will be illuminated, except for band 36.

When the lever arm 5 is shifted to a desired station, the band 42 is moved around rollers 37. This results in the positioning of aperture 43 in alignment with light rays from bulb 13, and the aperture 49 corresponding to the desired station. Thus, a spot of colored light 52 appears at that station setting. Shifting the knob 7 to another predetermined station causes a spot of differently colored light to appear in the dark band, the first spot 52 disappearing.

It is thereby seen that tuning and indicating adjustments become easy by this arrangement. It should be pointed out that if finder 30 is removed in this modification, strip 33 taken out, and a piece of colored material pasted over aperture 43, the band 42 being made transparent, of course, then the same result, viz, a constantly visible spot of colored light is secured, as described in connection with Figs. 1, 2 and 3.

In Figs. 9 and 10, there is shown another form of the invention, in which the endless band 42 (Fig. 7) may be replaced by a ribbon 42′ having its ends wound on spring tensioned spools 60, the latter being mounted on the side walls 16. The ribbon has an aperture 43′, and is of a width equal substantially to that of the strip 33. Thus, a dark band 36 is produced on the screen 11, as already described. The ribbon 42′ is coupled to arm 5, as shown in Fig. 6, and similarly, or differently, colored spots of light are thus projected on screen 11 when the knob 7 is moved to desired station settings. The operation, structure and possibilities of use are otherwise the same as in the aforegoing modification.

Another modified form of light control band is shown in Fig. 11, wherein a U-shaped flexible strip 42″ of opaque, stiff material, as blackened celluloid, is employed. A light aperture 43″ is provided, as already described. The ends of the strip 42″ are received in pockets 70, 70′ affixed to the wall 16. The strip is mechanically coupled to the lever arm 5 (not shown) as described heretofore, and sidewise motion of the lever arm results in the advance of either end of the strip 42″ into one or the other pocket and the shifting of the aperture 43″ relative to the screen and bulb 13.

Many variations in the use of this device are possible. For example, the apertures 49 of the strip may be used uncovered, and a piece of colored material pasted over the aperture 43 of the mobile light control band, thus producing an intermittently visible spot of colored indicating light on the screen. While we have indicated and described several systems for carrying our invention into effect, it will be apparent to one skilled in the art that our invention is by no means limited to the particular organizations shown and described, but that many modifications in the arrangements, as well as in the apparatus employed, may be made without departing from the scope of our invention as set forth in the appended claims.

What we claim is:

1. In an instrument indicating device, control means adapted to operate a tunable element, indicating means in cooperative relation to said control means, a source of illumination, and means for causing a constantly visible index image of a color different from that of the indicating means to travel across said indicating means, whereby to indicate the position of said control means.

2. In an instrument indicating device, control means adapted to operate a tunable element, indicating means in cooperative relation to said control means, a source of illumination, and means for causing a constantly visible beam from said source to travel across said indicating means in synchronism with said control means, said beam and indicating means being of contrasting colors.

3. In an instrument indicating device, control means, an indicating scale in cooperative relation to said control means, a source of illumination adapted to illuminate said indicating scale, and means on said control means for causing a constantly visible index image of a color different from said scale to travel intermittently across said indicating scale.

4. In an instrument indicating device, control means, indicating means in cooperative relation to said control means, a source of illumination and means for causing a constantly visible beam from said source to travel intermittently across said indicating means whereby to indicate the position of said control means, said beam and indicating means being of contrasting color.

5. In an instrument indicating device, control means, indicating scale means in cooperative relation to said control means, a source of illumination, means for projecting an index image upon said indicating scale means, and means for causing said projected index to move across said indicating means in constant visibility, said scale and image being of different colors.

6. In an instrument indicating device, control means, indicating means in cooperative relation to said control means, a source of illumination, means for projecting upon said indicating means a beam of light of different color than that emanating from said source, and means for causing said projected beam to appear on said indicating means only at predetermined points.

7. In an instrument indicating device, control means, indicating means in cooperative relation to said control means, a source of illumination, means for projecting upon said indicating means a beam of light different from that emanating from said source, and means for causing said projected beam to travel across said indicating means in constant visibility.

8. In combination, a tuning arm, a scale cooperating with an end of the arm, a source of illumination, and means associated with the arm for projecting an area of illumination on the scale of a color different from that of the source.

9. In combination, a scale, a tuning arm, a source of illumination, and means connected with the arm for producing a colored spot of light on the scale.

10. In combination, in a radio set, an illuminated scale, a tuning arm, and means operable with the arm for projecting a constantly visible colored area of light on the scale.

11. In combination, in a radio set, an illuminated scale, a tuning means, means for producing a normally non-illuminated area on the scale, and other means operable with the tuning means, for producing a spot of light in the area.

12. In combination, in a radio set, an illuminated scale, a tuning means, means for producing a normally non-illuminated area on the scale, and other means operable with the tuning means, for producing a spot of light in the area when the tuning means is adjusted to a predetermined point.

13. In combination, in a radio set, an illuminated scale, a tuning instrumentality, and means connected to the instrumentality for producing a colored spot of light on the scale and shifting the spot across the scale as the instrumentality is adjusted.

14. In a device of the character described, a light transmitting dial scale, an indicator arranged to traverse said scale, an illuminating means, and means arranged at the rear side of the dial scale and movable in unison with said indicator for producing a spot of light on said scale at the indicator.

15. In a device of the character described, a light transmitting dial scale, an indicator arranged to traverse said scale, an illuminating means, means to normally produce a non-illuminated area on the scale, and means arranged at the rear side of the dial scale and movable in unison with said indicator for producing a spot of light on said scale at the indicator.

16. A dial mechanism for a radio receiver comprising a scale, a tuning means, a source of illumination disposed at the rear side of the scale, means associated with the scale for providing a plurality of light transmission indications separated by opaque areas, and additional means, movable with the tuning means with respect to the scale, disposed between said source and scale and provided with an aperture whereby registration of said aperture and indication results in illumination of the indication.

MORRIS A. RABKIN.
ABRAHAM S. GREENBERG.